US012312771B2

(12) United States Patent
Nagao et al.

(10) Patent No.: US 12,312,771 B2
(45) Date of Patent: May 27, 2025

(54) WORK VEHICLE AND CONTROL METHOD FOR WORK VEHICLE

(71) Applicant: KUBOTA CORPORATION, Osaka (JP)

(72) Inventors: Kohei Nagao, Sakai (JP); Daiki Abe, Sakai (JP); Ryota Hamamoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 5 days.

(21) Appl. No.: 18/362,961

(22) Filed: Aug. 1, 2023

(65) Prior Publication Data

US 2024/0052598 A1 Feb. 15, 2024

(30) Foreign Application Priority Data

Aug. 10, 2022 (JP) .................................. 2022-127922

(51) Int. Cl.
*E02F 9/22* (2006.01)

(52) U.S. Cl.
CPC .......... *E02F 9/2221* (2013.01); *E02F 9/2246* (2013.01); *E02F 9/2285* (2013.01); *E02F 9/2292* (2013.01); *E02F 9/2296* (2013.01)

(58) Field of Classification Search
CPC ..... E02F 9/2246; E02F 9/2285; E02F 9/2289; E02F 9/2296; E02F 9/2221
See application file for complete search history.

(56) References Cited

U.S. PATENT DOCUMENTS

| 2011/0146283 | A1* | 6/2011 | Narazaki | E02F 9/2282 60/701 |
| 2014/0290237 | A1* | 10/2014 | Yoshida | E02F 3/325 60/431 |
| 2020/0190773 | A1* | 6/2020 | Hoshino | E02F 9/2296 |
| 2022/0154426 | A1* | 5/2022 | Indoh | E02F 9/2296 |
| 2022/0259821 | A1* | 8/2022 | Takahashi | F15B 21/087 |

FOREIGN PATENT DOCUMENTS

| JP | 5687971 B2 | 2/2013 |
| JP | 2017-067100 | 4/2017 |
| JP | 6695791 B2 | 7/2018 |
| JP | 2020-038002 | 3/2020 |
| JP | 2021-067146 | 4/2021 |

\* cited by examiner

*Primary Examiner* — Matthew Wiblin
(74) *Attorney, Agent, or Firm* — MORI & WARD, LLP

(57) ABSTRACT

A work vehicle includes a primary pressure control valve configured to control a pilot primary pressure of pilot oil. A secondary pressure control valve is configured to control a pilot secondary pressure of the pilot oil. Control circuitry is configured to control a rotation speed of an engine according to a target rotation speed. The control circuitry is configured to control the primary pressure control valve and the secondary pressure control valve based on a first target value of the pilot primary pressure and a second target value of the pilot secondary pressure. The control circuitry is configured to reduce the first target value and the second target value such that the second target value is higher than the first target value when the rotation speed of the engine detected by a rotation speed sensor becomes lower than the target rotation speed by a predetermined speed difference or more.

6 Claims, 9 Drawing Sheets

WORK VEHICLE AND CONTROL METHOD FOR WORK VEHICLE

CROSS-REFERENCE TO RELATED APPLICATIONS

The present application claims priority under 35 U. S. C. § 119 to Japanese Patent Application No. 2022-127922, filed Aug. 10, 2022. The contents of this application are incorporated herein by reference in their entirety.

BACKGROUND OF THE INVENTION

Technical Field

The present invention relates to a work vehicle and a control method of a work vehicle.

Discussion of the Background

Japanese Patent 5687971 discloses hydraulic circuit of a work vehicle that controls a primary pilot pressure, which is a pilot pressure of a primary pressure circuit between a traveling operation device and a pilot when an engine rotation speed drops Japanese Unexamined Patent Application Publication No. 2017-67100 discloses a hydraulic circuit of a work vehicle that controls a pilot secondary pressure, which is a pilot pressure of a secondary pressure circuit between a travel operation device and a pilot port of a hydraulic pump, when an engine rotation speed drops. Japanese Patent No. 6695791 discloses a hydraulic circuit of a work vehicle using a relief valve as another method of controlling the secondary pilot pressure.

SUMMARY OF THE INVENTION

According to one aspect of the present disclosure, a work vehicle includes a hydraulic motor, a hydraulic pump, an engine, a rotation speed sensor, a pilot pump, a travel instruction input device, an operation valve, a first pilot oil passage, a primary pressure control valve, a second pilot oil passage, a secondary pressure control valve, and control circuitry. The hydraulic motor is configured to drive the traveling device. The hydraulic pump includes a pilot port to which pilot pressure of pilot oil is applied. The hydraulic pump is configured to supply the hydraulic fluid to the hydraulic motor in accordance with the pilot pressure. The engine is configured to drive the hydraulic pump. The rotation speed sensor is configured to detect a rotation speed of the engine. The pilot pump is configured to be driven by the engine to discharge pilot oil. A travel instruction input device is configured to receive an instruction of a travel direction from a user. The operation valve is connected to the first pilot oil passage and is configured to control the pilot pressure by operation of the travel instruction input device. The first pilot oil passage connects the pilot pump and the operation valve, and the pilot oil is supplied through the first pilot oil passage. The primary pressure control valve is provided in the first pilot oil passage, and is configured to control a pilot primary pressure which is the pressure of the pilot oil in the first pilot oil passage. The second pilot oil passage connects the operation valve and the pilot port, through which the pilot oil is supplied through the second pilot oil passage. The secondary pressure control valve is connected to the second pilot oil passage and is configured to control a pilot secondary pressure which is a pressure of the pilot oil in the second pilot oil passage. The control circuitry is configured to control the rotation speed of the engine according to a target rotation speed of the engine rotational speed. The control circuitry is configured to control the primary pressure control valve and the secondary pressure control valve based on a first target value of the pilot primary pressure and a second target value of the pilot secondary pressure. The control circuitry is configured to reduce the first target value and the second target value such that the second target value is higher than the first target value when the rotation speed of the engine detected by the rotation speed sensor becomes lower than the target rotation speed by a predetermined speed difference or more.

According to another aspect of the present disclosure, a control method for the work vehicle includes controlling an engine so that a rotation speed of the engine becomes a target rotation speed and driving a hydraulic pump connected to the engine such that the hydraulic pump discharges hydraulic fluid to a hydraulic motor connected to a traveling device. The control method includes driving a pilot pump connected to the engine such that the pilot pump discharges pilot oil to the first pilot oil passage. The control method includes controlling an operation valve connected to the first pilot oil passage according to an instruction of a traveling direction by a user to convert a pilot primary pressure, which is a pressure of the pilot oil provided through the first pilot oil passage, into a pilot secondary pressure to be applied to the pilot oil in a second pilot oil passage connecting the operation valve and a pilot port of the hydraulic pump. The control method includes controlling a primary pressure control valve provided in a first pilot oil passage in order for the pilot primary pressure to become a first target value; controlling a secondary pressure control valve connected to the second pilot oil passage in order for the pilot secondary pressure to become a second target value; detecting a rotational speed of the engine; and controlling both the primary pressure control valve $6a$ and the secondary pressure control valve to make the second target value higher than the first target value and to reduce the first target value and the second target value when the rotation speed of the engine detected by the rotation speed sensor becomes lower than the target rotation speed by a predetermined speed difference or more.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

DESCRIPTION OF THE EMBODIMENTS

Figure 1:
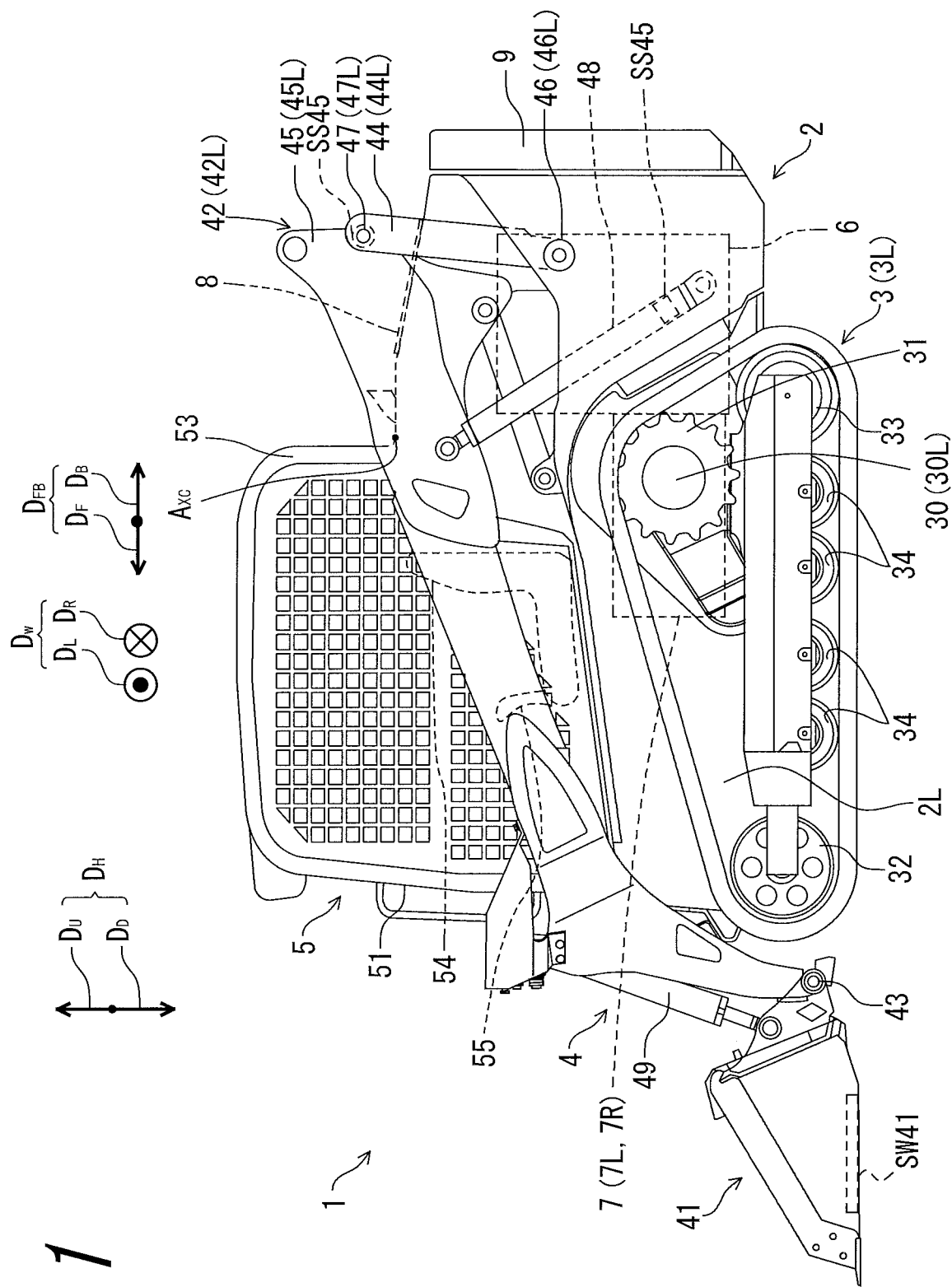
FIG. 1 is a side view of a work vehicle.

Hereinafter, the present invention will be described in detail based on the drawings showing embodiments thereof. In the drawings, like reference numerals indicate corresponding or substantially identical features.

First Embodiment

<Overall Configuration>

Figure 2:
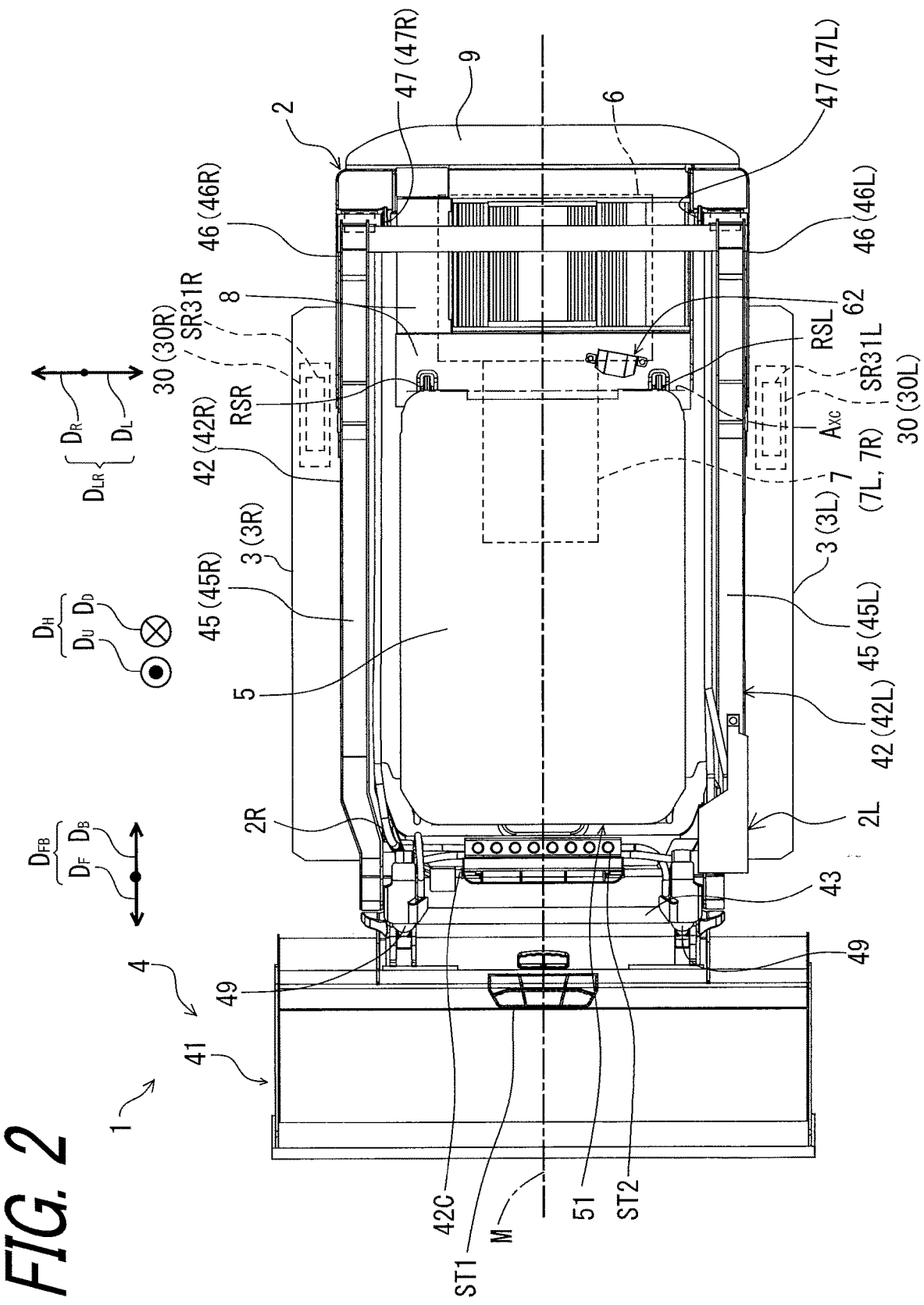
FIG. 2 is a top view of the work vehicle.

Referring to FIGS. 1 and 2, a work vehicle 1, such as a compact truck loader, includes a vehicle body 2, a pair of traveling devices 3, and a work device 4. The vehicle body 2 supports the traveling device 3 and the work device 4. In the illustrated embodiment, the traveling device 3 is a crawler-type traveling device 3. Therefore, each of the pair of traveling devices 3 includes a drive wheel 31, driven wheels 32 and 33, and a rolling wheel 34 which are driven by the hydraulic motor device 30. However, each of the pair of traveling devices 3 is not limited to the crawler type traveling device 3. Each of the pair of traveling devices 3 may be, for example, a front-wheel/rear-wheel traveling device 3 or may be a traveling device 3 having a front-wheel and a rear crawler. The work device 4 comprises a work equipment (bucket) 41 at a distal end of the work device 4. A proximal end of the work device 4 is attached to a rear portion of the vehicle body 2. The work device 4 includes a pair of arm assemblies 42 for rotatably supporting the bucket 41 via a bucket pivot shaft 43. Each of the pair of arm assemblies 42 includes a link 44 and arm 45.

The link 44 includes is rotatable with respect to the vehicle body 2 around a fulcrum shaft. The arm 45 is rotatable with respect to the link 44 around a joint shaft 47. The work device 4 further comprises a plurality of arm cylinders 48 and at least one equipment cylinder 49. Each of the arm cylinders 48 is rotatably connected to the vehicle body 2 and the arm 45, and moves the link 44, the arm 45, and the like to raise and lower the bucket 41. The at least one tool cylinder 49 is configured to tilt the bucket 41. The vehicle body 2 includes a cabin 5. The cabin 5 is provided with a front window 51 which can be opened and closed, and its outer shape is defined by a cab frame 53. The front window 51 may be omitted. The work vehicle 1 includes a driver's seat 54 and a travel instruction input device 55 in the cabin 5. The cab frame 53 is rotatable about rotational shafts RSL and RSR on the vehicle body 2 as shown in FIG. 2. FIGS. 1 and 2 illustrate a common pivot AXC defined by rotational shafts RSL and RSR. That is, the cab frame 53 is attached to the vehicle body 2 so as to be rotatable around the pivot AXC.

In the embodiment according to the present application, a front-back direction $D_{FB}$ (forward direction $D_F$/backward direction $D_B$) means a front-back direction (forward direction/backward direction) as seen from an operator seated on the driver's seat 54 of the cabin 5. A leftward direction $D_L$, a rightward direction $D_R$, a width direction $D_W$ means the left direction, the right direction, and the left-right direction as viewed from the operator, respectively. An upward direction $D_U$, a downward direction $D_D$, height direction $D_H$ means an upward direction, a downward direction, and a height direction as viewed from the operator. The front-back, left-right (width), and up-down (height) directions of the work vehicle 1 coincide with the front-back, left-right (width), and up-down (height) directions as viewed from the operator, respectively.

FIG. 1 shows the left side of the work vehicle 1. As shown in FIG. 2, the vehicle body 2 is substantially plane-symmetric with respect to the vehicle body center surface M, and is a first side surface 2L which is a left side surface and a second side surface 2R which is a right side face. Among the pair of traveling devices 3, the traveling device 3 provided on the first side surface 2L is shown as the first traveling device 3L, and the traveling device 3 provided on the second side surface 2R is shown as the second traveling device 3R. Among the pair of arm assemblies 42, the arm assembly 42 provided on the left side with respect to the vehicle body center surface M is shown as the first arm assembly 42L, and the arm assembly 42 provided on the right side with respect to the vehicle body center surface M is shown as the second arm assembly 42R. The link 44 provided on the left side of the vehicle body center surface M is shown as a first link 44L. An arm 45 provided on the left side of the vehicle body center surface M is shown as a first arm 45L, and an arm 45 provided on the right side of the vehicle body center surface M is shown as a second arm 45R. The fulcrum shaft 46 provided on the left side of the vehicle body center surface M is shown as the first fulcrum shaft 46L. The fulcrum shaft 46 provided on the right side with respect to the vehicle body center surface M is shown as a second fulcrum shaft 46R. The joint shaft 47 provided on the left side with respect to the vehicle body center surface M is shown as a first joint shaft 47L, and the joint shaft 47 provided on the right side with respect to the vehicle body center surface M is shown as a second joint shaft 47R. Among the hydraulic motor devices 30, the hydraulic motor device 30 provided on the left side with respect to the vehicle body center surface M is shown as the first hydraulic motor device 30L. The hydraulic motor device 30 provided on the right side with respect to the vehicle body center surface M is shown as a second hydraulic motor device 30R.

Referring to FIGS. 1 and 2, the work vehicle 1 includes an engine 6 and provided at a rear portion of the vehicle body 2, and a plurality of hydraulic pumps including the first hydraulic pump 7L and the second hydraulic pump 7R. The engine 6 drives a plurality of hydraulic pumps 7. The first hydraulic pump 7L and the second hydraulic pump 7R are configured to discharge hydraulic fluid for driving a hydraulic motor device 30 for driving the drive wheel 31. The first hydraulic pump 7L and the second hydraulic pump 7R are collectively referred to as hydraulic pumps (7L, 7R). The plurality of hydraulic pumps 7 other than the first hydraulic pump 7L and the second hydraulic pump 7R is configured to discharge hydraulic fluid for driving a hydraulic actuator (a plurality of arm cylinders 48, at least one equipment cylinder 49, or the like) connected to the work device 4. The engine 6 is provided between a pair of arm assemblies 42 in the width direction DW of the work vehicle 1. The work vehicle 1 further includes a cover 8 for covering the engine 6. The work vehicle 1 further includes a bonnet cover 9 provided at the rear end of the vehicle body 2. The bonnet cover 9 is openable and closable such that a maintenance personnel can perform maintenance work on the engine 6 and the like.

Figure 3:
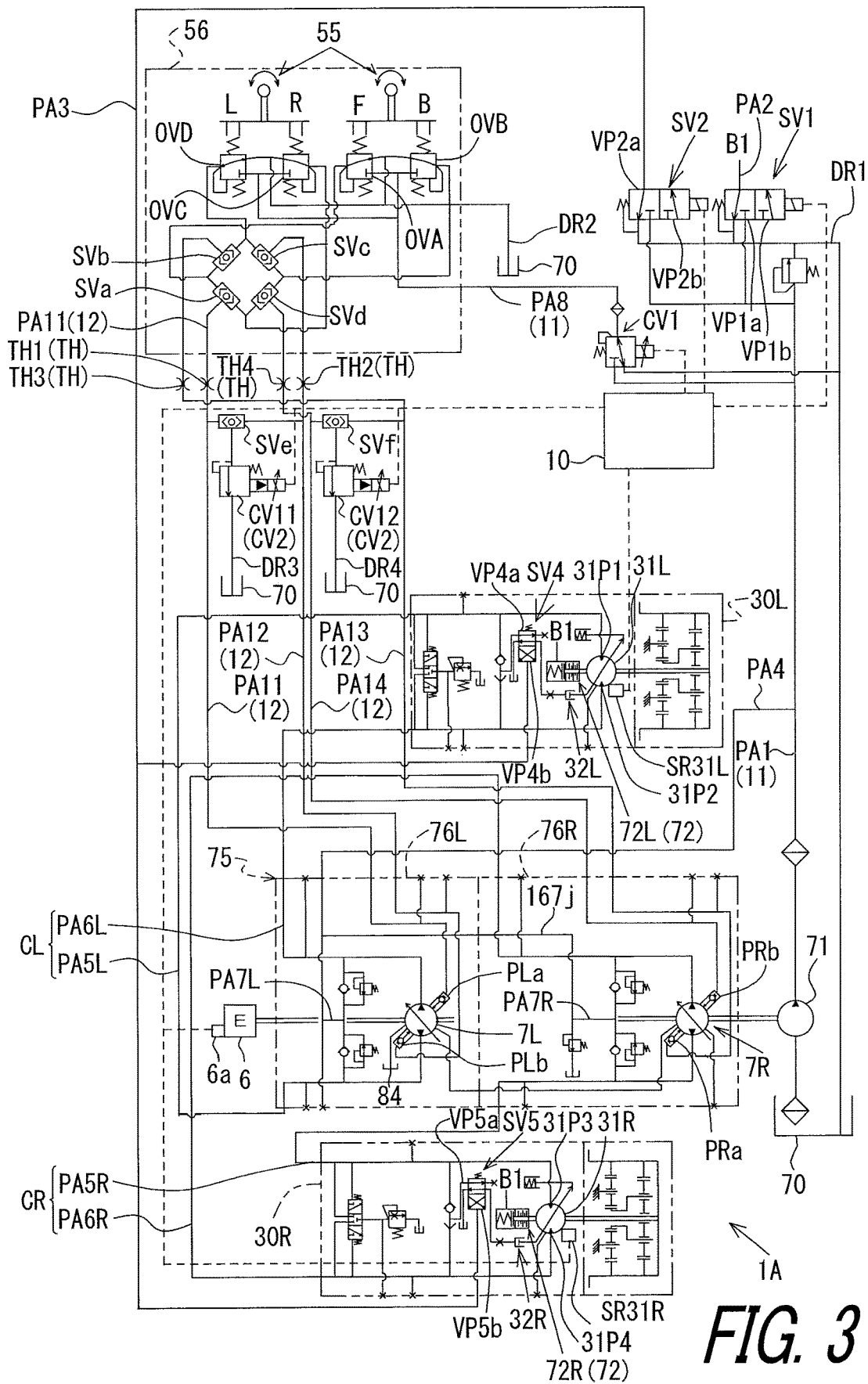
FIG. 3 is a hydraulic circuit diagram of a traveling system of a work vehicle.

FIG. 3 is a hydraulic circuit diagram of a travel system of the work vehicle 1. The work vehicle includes a hydraulic circuit 1A. The hydraulic circuit 1A includes a hydraulic fluid tank 70 and a pilot pump 71. The pilot pump 71 is a constant displacement gear pump driven by the power of the engine 6. The pilot pump 71 is configured to discharge the hydraulic fluid stored in the hydraulic fluid tank 70. In particular, the pilot pump 71 is configured to discharge a hydraulic fluid mainly used for control. For convenience of explanation, among the hydraulic fluid discharged from the pilot pump 71, the hydraulic fluid used for control is referred to as pilot oil, and the pressure of the pilot oil is referred to as pilot pressure. In particular, the pilot pump 71 is configured to supply pilot oil to a first hydraulic pump 7L and a second hydraulic pump 7R.

The hydraulic circuit 1A includes a pilot supply oil passage PA1 connected to a discharge port of a pilot pump 71. The pilot oil shall be supplied in the pilot supply oil passage PA1. The hydraulic circuit 1A includes a plurality of switching valves (brake switching valves, direction switching valve SV2) connected to the pilot supply oil passage PA1, and a plurality of brake mechanisms 72. The brake switching valve SV1 is connected to the pilot supply oil passage PA1. The brake switching valve SV1 is a direction switching valve (solenoid valve) for braking and releasing braking by the plurality of brake mechanisms 72. The brake switching valve SV1 is a two-position switching valve configured to switch a valve element to the first position VP1a and the second position VP1b by exciting. Switching of the valve element of the brake switching valve SV1 is performed by the brake pedal 13 (see FIG. 6). The brake pedal 13 is provided with a sensor 14. The operation amount detected by the sensor 14 is input to a controller (control circuitry) 10 composed of an ECU (Electric Control Unit.

The plurality of brake mechanisms 72 include a first brake mechanism 72L for braking the first traveling device 3L and a second brake mechanism 72R for braking the second traveling device 3R. The first brake mechanism 72L and the second brake mechanism 72R are connected to the brake switching valve via the oil passage PA2. The first brake mechanism 72L and the second brake mechanism 72R are configured to brake the traveling device 3 according to the pressure of the pilot oil (hydraulic fluid). When the valve element of the brake switching valve SV1 is switched to the first position VP1a, the hydraulic fluid is released from the oil passage PA2 in the section between the brake switching valve SV1 and the brake mechanism 72, and the traveling device 3 is braked by the brake mechanism 72. When the valve element of the brake switching valve SV1 is switched to the second position VP1b, the braking by the brake mechanism 72 is released. When the valve element of the brake switching valve SV1 is switched to the first position VP1a, the braking by the brake mechanism 72 is released, and when the valve element of the brake switching valve SV1 is switched to the second position VP1b, the traveling device 3 may be braked by the brake mechanism 72.

The direction switching valve SV2 is an electromagnetic valve for changing the rotation of the first hydraulic motor device 30L and the second hydraulic motor device 30R. The direction switching valve SV2 is a two-position switching valve configured to switch a valve element to the first position VP2a or second position VP2b by excitation. Switching of the direction switching valve SV2 is performed by an operating member (not illustrated) or the like. The direction switching valve SV2 may be a proportional valve capable of adjusting the flow rate of the hydraulic fluid to be discharged, instead of a two-position switching valve.

The first hydraulic motor device 30L is a device for transmitting power to drive wheel 31 provided in the first traveling device 3L. The first hydraulic motor device 30L includes a first hydraulic motor 31L, a first swash plate switching cylinder 32L, and a first travel control valve (hydraulic switching valve) SV4. The first hydraulic motor 31L is a swash plate type variable capacity axial motor for driving the first traveling device 3L, and is a motor capable of changing the vehicle speed (rotation) to a first speed or a second speed. The first swash plate switching cylinder 32L is configured to change the angle of the swash plate of the first hydraulic motor 31L by expansion and contraction. The first travel control valve SV4 expands and contracts the first swash plate switching cylinder 32L. The first travel control valve SV4 is a two-position switching valve configured to switch its valve element between the first position VP4a and the second position VP4b.

Switching of the first travel control valve SV4 is performed by a direction switching valve SV2 located on the upstream side and connected to the first travel control valve SV4. Specifically, the direction switching valve SV2 and the first travel control valve SV4 is connected by the oil passage PA3 and the switching operation of the first travel control valve SV4 is performed by hydraulic fluid flowing through the oil passage PA3. For example, the valve element of the direction switching valve SV2 is switched to the first position VP2a, the pilot oil is released in the section between the direction switching valve SV2 and the first travel control valve SV4, and the valve element of the first travel control valve SV4 is switched to the first position VP4a. As a result, the first swash plate switching cylinder 32L contracts, and the speed of the first hydraulic motor 31L is changed to the first speed. When the valve element of the direction switching valve SV2 is switched to the second position VP2b by the operation of the operating member, the pilot oil is supplied to the first travel control valve SV4 through the direction switching valve SV2, and the valve element of the first travel control valve SV4 is switched to the second position VP4b. As a result, the first swash plate switching cylinder 32L is extended, and the speed of the first hydraulic motor 31L is changed to the second speed.

The second hydraulic motor device 30R transmits power to the drive wheel 31 provided in the second traveling device 3R. The second hydraulic motor device 30R includes a second hydraulic motor device 30R, a second hydraulic motor 31R, a second swash plate switching cylinder 32R, and a second travel control valve (hydraulic switching valve). The second hydraulic motor device 30R is a hydraulic motor for driving the second traveling device 3R, and operates similarly to the first hydraulic motor device 30L. That is, the second hydraulic motor 31R operates in the same manner as the first hydraulic motor 31L. The first hydraulic motor 31L and the second hydraulic motor 31R are collectively referred to as hydraulic motors (31L, 31R). The second swash plate switching cylinder 32R operates in the same manner as the first swash plate switching cylinder 32L. The second travel control valve SV5 is a two-position switching valve configured to switch its valve element between the first position VP5a and the second position VP5b, and operates in the same manner as the first travel control valve SV4.

A drain oil passage DR1 is connected to the hydraulic circuit 1A. The drain oil passage DR1 is an oil passage to make the pilot oil flow from a plurality of switching valves (a brake switching valve SV1 and a direction switching valve SV2) to the hydraulic fluid tank 70. For example, the drain oil passage DR1 is connected to a discharge port of a plurality of switching valves (a brake switching valve SV1 and a direction switching valve SV2). That is, when the brake switching valve SV1 is at the first position VP1a, the hydraulic fluid is discharged from the oil passage PA2 to the drain oil passage DR1 in the interval between the brake switching valve SV1 and the brake mechanism 72. When the direction switching valve SV2 is located at the first position VP1a, the pilot oil in the oil passage PA3 is discharged to the drain oil passage DR1.

The hydraulic circuit 1A further includes a first charge oil passage PA4 and a hydraulic drive device 75. The first charge oil passage PA4 is branched from the pilot supply oil passage PA1 and connected to the hydraulic drive device 75. The hydraulic drive device 75 drives the first hydraulic motor device 30L and the second hydraulic motor device 30R. The hydraulic drive device 75 includes a first drive circuit 76L for driving the first hydraulic motor device 30L and a second drive circuit 76R for driving the second hydraulic motor device 30R.

The first drive circuit 76L includes the first hydraulic pump 7L, a drive oil passage PA5L, PA6L, and a second charge oil passage PA7L. The driving oil passages PA5L and PA6L are oil passages for connecting the first hydraulic pump 7L and the first hydraulic motor 31L. The hydraulic circuit formed by the driving oil passages PA5L and PA6L is referred to as a first hydraulic circuit CL. The second charge oil passage PA7L, which is connected to the drive oil passages PA5L and PA6L, is an oil passage for replenishing the drive oil passages PA5L and PA6L with the hydraulic fluid from the pilot pump 71. The first hydraulic motor 31L has a first connection port 31P1 connected to the drive oil passage PA5L and a second connection port 31P2 connected to the drive oil passage PA6L. The hydraulic fluid for rotating the first traveling device 3L in the backward direction is inputted to the first hydraulic motor 31L) via the first connection port 31P1, and the hydraulic fluid for rotating the first traveling device 3L in the forward direction is discharged from the first hydraulic motor 31L via the first connection port 31P1. The hydraulic fluid for rotating the first traveling device 3L in the backward direction is input to the first hydraulic motor 31L via the second connection port 31P2, and hydraulic fluid for rotating the first traveling device 3L in the forward direction is discharged from the first traveling device 3L.

Similarly, the second drive circuit 76R includes a second hydraulic pump 7R, drive oil passages PA5R and PA6R, and a third charge oil passage PA7R. The drive oil passages PA5R and PA6R are oil passages connecting the second hydraulic pump 7R and the second hydraulic motor 31R. The hydraulic circuit formed by the drive oil passages PA5R and PA6R is referred to as the second hydraulic circuit CR. The third charge oil passage PA7R is an oil passage which is connected to the drive oil passages PA5R and PA6R and replenishes the drive oil passages PA5R and PA6R with the hydraulic fluid from the pilot pump 71. The second hydraulic motor 31R includes a third connection port 31P3 connected to the drive oil passage PA5R, and a fourth connection port 31P4 connected to the drive oil passage PA6R. The hydraulic fluid for rotating the second traveling device 3R in the forward direction is input to the second hydraulic motor 31R via the third connection port 31P3, and the hydraulic fluid for rotating the second traveling device 3R in the backward direction is discharged from the second hydraulic motor 31R via the third connection port 31P3. The hydraulic fluid for rotating the second traveling device 3R in the backward direction is input to the second hydraulic motor 31R via the fourth connection port 31P4, and the hydraulic fluid for rotating the second traveling device 3R in the forward direction is discharged from the second traveling device 3R.

The first hydraulic pump 7L and the second hydraulic pump 7R are swash plate type variable capacity axial pump which is driven by the power of the engine 6. The first hydraulic pump 7L which is connected to a first hydraulic motor 31L via a first hydraulic circuit CL includes a first port PLa and a second port PLb to which a pilot pressure acts. The angle of the swash plate in the first hydraulic pump 7L is changed by the pilot pressure acting on the first port PLa and the second port PLb. Specifically, the first hydraulic pump 7L supplies hydraulic fluid to a first hydraulic motor 31L via a first hydraulic circuit CL so as to drive a first traveling device 3L forward when the hydraulic pressure applied to a second port PLb is higher than the hydraulic pressure applied to a first port PLa, and hydraulic fluid is supplied to the first hydraulic motor 31L via a first hydraulic circuit CL so as to drive the first traveling device 3L backward when the hydraulic pressure applied to a second port PLb is higher than the hydraulic pressure applied to a first port PLa. That is, the first hydraulic pump 7L is configured to supply the hydraulic fluid to the first hydraulic motor 31L in accordance with the pilot pressure.

The second hydraulic pump 7R which is connected to the second hydraulic motor 31R via the second hydraulic circuit CR, includes a third port PRa and a fourth port PRb to which the pilot pressure acts. Specifically, the second hydraulic pump 7R is configured such that when the hydraulic pressure applied to the third port PRa is higher than the hydraulic pressure applied to the fourth port PRb, the second hydraulic pump 7R supplies hydraulic fluid to the second hydraulic motor 31R via a second hydraulic circuit CR so as to drive the second traveling device 3R forward, and when the hydraulic pressure applied to the fourth port PRb is higher than the hydraulic pressure applied to the third port PRa, the second hydraulic pump 7R supplies hydraulic fluid to the second hydraulic motor 31R via a second hydraulic circuit CR so as to drive the second traveling device 3R backward. The first hydraulic pump 7L and the second hydraulic pump 7R can change the output (discharge amount of the hydraulic fluid) and the discharge direction of the hydraulic fluid in accordance with the angle of the swash plate.

The outputs of the first hydraulic pump 7L and the second hydraulic pump 7R and the discharge direction of the hydraulic fluid are changed by an operation device 56 for operating the traveling direction of the work vehicle 1. Hereinafter, the operation device 56 may be referred to as a direction input device. To be more specific, the outputs of the first and second hydraulic pumps 7L and 7R and the discharge direction of the hydraulic fluid are changed in accordance with the operation of the travel instruction input device 55 included in the operation device 56. That is, the operation device 56 is a device configured to select at least one of the traveling devices of the first traveling device 3L and the second traveling device 3R and instruct the at least one of the traveling devices to move forward or backward to operate the traveling direction of the work vehicle. In the following description, the travel instruction input device, for example, an operation lever. An instruction of a traveling direction is input by the user through the travel instruction input device 55.

As shown in FIG. 3, the hydraulic circuit 1A includes a pilot supply oil passage PA8 which is branched from the pilot supply oil passage PA1 and connected to the operation device 56, and a primary pressure control valve CV1 provided on a pilot supply oil passage PA8. In the following embodiments, the pilot supply oil passage PA1 and the pilot supply oil passage PA8 are collectively referred to as a first pilot oil passage 11. The pilot oil is fed via the first pilot oil passage 11. The primary pressure control valve CV1 is a proportional solenoid valve and is configured to adjust the pilot pressure supplied to the operation device 56 by adjusting an opening degree thereof. The opening degree of the primary pressure control valve CV1 is controlled by the controller 10. The primary pressure control valve CV1 is provided in the first pilot oil passage 11, and is configured to control the pilot primary pressure which is the pressure of the pilot oil in the first pilot oil passage 11. The detailed operation of the primary pressure control valve CV1 will be described later.

The operation device 56 (direction input device) includes an operation valve OVA for forward movement, an operation valve OVB for backward movement, an operation valve OVC for right turning, an operation valve OVD for left turning, and a travel instruction input device 55. The operation device 56 has first to fourth shuttle valves SVa, SVb, SVc, and SVd. The operation valves OVA, OVB, OVC, and OVD are operated by a travel instruction input device 55 (one operation lever). The operation valves OVA, OVB, OVC, and OVD change the pressures of the pilot oil in accordance with the operation of the travel instruction input device 55, and supply the changed hydraulic fluid to the first pilot port PLa and the second pilot port PLb of the first hydraulic pump 7L and the third pilot port PRa and the fourth pilot port PRb of the second hydraulic pump 7R. That is, the operation valves OVA, OVB, OVC, and OVD are connected to the first pilot oil passage 11 and are configured to control the pilot pressure by the operation of the travel instruction input device 55. In the embodiment according to the present application, the operation valves OVA, OVB, OVC, and OVD are operated by one operation lever, but a plurality of operation levers may be provided.

Each of the operation valves OVA, OVB, OVC, and OVD has an input port (primary side port), a discharge port, and an output port (secondary side port). As shown in FIG. 3, the input port is connected to the pilot supply oil passage PA8. The discharge port is connected to the drain oil passage D which goes to a hydraulic fluid tank 70. The travel instruction input device 55 is tiltable from a neutral position in a front-rear direction, a width direction orthogonal to the front-rear direction, and an oblique direction. In response to the tilt of the travel instruction input device 55, the operation valves OVA, OVB, OVC, OVD of the operation device 56 are operated. Thus, the pilot pressure corresponding to the operation amount from the neutral position of the travel instruction input device 55 is output from the secondary side port of each of the operation valves OVA, OVB, OVC, and OVD. The relationship between the pilot pressure applied to the primary-side port and output from the primary pressure control valve CV1 and the pilot pressure applied to the secondary-side port will be described later.

The secondary-side ports of the operation valves OVA and OVC are connected to the input-side ports of the first shuttle valve SVa, and the output-side port of the first shuttle valve SVa is connected to the first pilot port PLa of the first hydraulic pump 7L via the first secondary pilot oil passage PA1 The secondary-side port of the operation valve OVB and the secondary-side port of the operation valve OVD are connected to the input port of a third shuttle valve SVc, and an output port of the third shuttle valve SVc is connected to the secondary-side port of a first hydraulic pump 7L via the second secondary pilot oil passage PA12. The secondary-side port of the operation valve OVB and the secondary-side port of the operation valve OVC are connected to an input port of a fourth shuttle valve SVd, and an output port of the fourth shuttle valve SVd is connected to a fourth port PRb of a second hydraulic pump 7R via a fourth secondary pilot oil passage PA14.

That is, the pilot supply oil passage PA8, the first secondary pilot oil passage PA11, and the fourth secondary pilot oil passage PA14 connect the pilot pump 71 and the first hydraulic pump 7L. The pilot supply oil passage PA8, the second secondary pilot oil passage PA12, and the third secondary pilot oil passage PA13 connect the pilot pump 71 and the second hydraulic pump 7R. In the following embodiments, the first secondary pilot oil passage PA11, the fourth secondary pilot oil passage PA14, the second secondary pilot oil passage PA12, and the third secondary pilot oil passage PA13 are collectively referred to as a plurality of second pilot oil passages 12. Each of the plurality of second pilot oil passages 12 connects one of the operation valves OVA, OVB, OVC, and OVD to one of the pilot ports PLa, PLb, PRa, and PRb. Pilot oil is fed through the second pilot oil passage 12.

The hydraulic circuit 1A further includes a fifth shuttle valve SVe, a sixth shuttle valve SVf, secondary pressure control valves CV11, CV12, and discharge oil passages DR3 and DR4. The first secondary pilot oil passage PA11 and the second secondary pilot oil passage PA12 are connected to input ports of the fifth shuttle valve SVe, and an outlet port of the fifth shuttle valve SVe is connected to an input port of the secondary pressure control valve CV11 via the discharge oil passage DR3. The higher one of the oil pressure in the first secondary pilot oil passage PA11 and the oil pressure in the second secondary pilot oil passage PA12 is applied to the input port of the fifth shuttle valve SVe.

The third secondary pilot oil passage PA13 and the fourth secondary pilot oil passage PA14 are connected to input ports of the sixth shuttle valve SVf, and an outlet port of the sixth shuttle valve SVf is connected to an input port of the secondary pressure control valve CV12 via the discharge oil passage DR4. The higher one of the oil pressure of the third secondary pilot oil passage PA13 and the oil pressure of the fourth secondary pilot oil passage PA14 is applied to the input port of the sixth shuttle valve SVf.

The secondary pressure control valve CV11 is a proportional solenoid relief valve, and is configured to open when the higher one of the oil pressure of the first secondary pilot oil passage PA11 and the oil pressure of the second secondary pilot oil passage PA12 applied to the input port thereof is larger than the oil pressure corresponding to the current applied to the solenoid. When the secondary pressure control valve CV12 is opened, the pilot oil in the pilot oil passage 11 having a higher oil pressure out of the first secondary pilot oil passage PA11 and the second secondary pilot oil passage PA12 is discharged to the hydraulic fluid tank 70. In this way, by adjusting the current applied to the solenoid, the pilot secondary pressures which are the pressures of the pilot oil in the first secondary pilot oil passage PA11 and the second secondary pilot oil passage PA12 are controlled.

The secondary pressure control valve CV12 is a proportional solenoid relief valve, and is configured to open when the higher one of the oil pressure of the third secondary pilot oil passage PA13 and the oil pressure of the fourth secondary pilot oil passage PA14 applied to the input port thereof is larger than the oil pressure corresponding to the current applied to the solenoid. In this way, by adjusting the current applied to the solenoid, the secondary pilot pressures which are the pressures of the pilot oil in the third secondary pilot oil passage PA13 and the fourth secondary pilot oil passage PA14 are controlled. In the following embodiments, secondary pressure control valves CV11, CV12 are collectively referred as secondary pressure control valves CV2. Discharge oil passages DR3, DR4 are branched off from the second pilot oil passage and connected to the secondary pressure control valves CV2. The secondary pressure control valves CV2 is connected to the second pilot oil passage 12, and is configured to control the pilot secondary pressure which is the pressure of the pilot oil in the second pilot oil passage 12. The detailed operation of the secondary pressure control valves CV2 will be described later.

The hydraulic circuit 1A further includes throttles TH1 to TH4. The throttle TH1 is provided in the first secondary pilot oil passage PA11 between first shuttle valve SVa and a fifth shuttle valve SVe and configured to reduce the flow rate of the pilot oil in the first secondary pilot oil passage PA11. The throttle TH2 is provided in the second secondary pilot oil passage PA12 between the second shuttle valve SVb and fifth shuttle valve SVe, and is configured to reduce the flow rate of the pilot oil in the second secondary pilot oil passage PA12. The throttle TH3 is provided in the third secondary pilot oil passage PA13 between the third shuttle valve SVc and fifth shuttle valve SVe, and is configured to reduce the flow rate of the pilot oil in the third secondary pilot oil passage PA13. The throttle TH4 is provided in the fourth secondary pilot oil passage PA14 between the fourth shuttle valve SVd and fifth shuttle valve SVe, and is configured to reduce the flow rate of the pilot oil in the fourth secondary pilot oil passage PA14. In the following embodiments, the throttles TH1 to TH4 are collectively referred to as throttles TH. That is, the throttles TH are provided in the second pilot oil passages 12 between the operation valves OVA, OVB, OVC, and OVD and the discharge oil passages DR3 and DR4. The throttle TH may be omitted.

When the travel instruction input device 55 is tilted forward, the forward operation valve OVA is operated and the pilot pressure is output from the operation valve OVA. This pilot pressure acts from the first shuttle valve SVa to the first pilot port PLa via the first secondary pilot oil passage PA11 connecting the operation device 56 and the first pilot port PLa of the first hydraulic pump 7L, and acts from the second shuttle valve SVb to the third pilot port PRa via the third secondary pilot oil passage PA13 connecting the operation device 56 and the third pilot port PRa of the second hydraulic pump 7R. As a result, the output shafts of the first and second hydraulic pumps 7L and 7R rotate in the normal direction (forward rotation) at a speed corresponding to the amount of tilting of the travel instruction input device 55, and the work vehicle 1 moves straight forward.

When the travel instruction input device 55 is tilted to the rear side, the reverse operation valve OVB is operated and the pilot pressure is outputted from the operation valve OVB. This pilot pressure acts from the third shuttle valve SVc to the second pilot port PLb of the first hydraulic pump 7L via the second secondary pilot oil passage PA12 connecting the operation device 56 and the second pilot port PLb, and acts from the fourth shuttle valve SVd to the fourth pilot port PRb via the fourth secondary pilot oil passage PA14 connecting the operation device 56 and the fourth pilot port PRb of the second hydraulic pump 7R. As a result, the output shafts of the first and second hydraulic pumps 7L and 7R are reversed (rotated backward) at a speed corresponding to the amount of tilting of the travel instruction input device 55, and the work vehicle 1 travels straight backward.

When the travel instruction input device 55 is tilted to the right side, the operation valve OVC for right turning is operated and the pilot pressure is output from the operation valve OVC. This pilot pressure acts on the first pilot port PLa of the first hydraulic pump 7L from the first shuttle valve SVa via the first secondary pilot oil passage PA11, and also acts on the fourth pilot port PRb of the second hydraulic pump 7R from the fourth shuttle valve SVd via the fourth secondary pilot oil passage PA14. Thereby, In the right direction of the travel instruction input device 55 it curves to the right with a degree of curvature corresponding to the operating position in the right direction of the travel instruction input device 55.

When the travel instruction input device 55 is tilted to the left side, the operation valve OVD for left turning is operated and the pilot pressure is output from the operation valve OVD. This pilot pressure acts on the third pilot port PRa of the second hydraulic pump 7R from the second shuttle valve SVb via the third secondary pilot oil passage PA13, and also acts on the second pilot port PLb of the first hydraulic pump 7L from the third shuttle valve SVc via the second secondary pilot oil passage PA12. As a result, the vehicle turns leftward with a degree of bending corresponding to the leftward operation position of the travel instruction input device 55.

That is, when the travel instruction input device 55 is operated to be tilted to the obliquely front left side, the work vehicle 1 moves forward at a speed corresponding to the operation position of the travel instruction input device 55 in the front-rear direction, and to the left with a degree of curve corresponding to the operation position of the travel instruction input device 55 in the left direction. When the travel instruction input device 55 is tilted to the right front side, the work vehicle 1 turns to the right while moving forward at a speed corresponding to the operation position of the travel instruction input device 55. When the travel instruction input device 55 is tilted diagonally to the rear left side, the work vehicle 1 turns left while moving backward at a speed corresponding to the operation position of the travel instruction input device 55. When the travel instruction input device 55 is tilted diagonally to the right rear side, the work vehicle 1 turns to the right while moving backward at a speed corresponding to the operation position of the travel instruction input device 55.

Next, a detailed operation of the primary pressure control valve CV1 will be described. The work vehicle 1 includes a setting member 16 (see FIG. 7) that sets the target rotation speed of the engine 6. The setting member 16 is an accelerator pedal which is a speed input device different from the above-described direction input device or an accelerator lever which is supported so as to be swingable. The setting member 16 is provided with a sensor 17. The operation amount detected by the sensor 17 is input to the controller 10. The engine rotation speed corresponding to the operation amount detected by the sensor 17 is the target rotation speed of the engine 6. In other words, the target rotation speed of the engine 6 is set based on the operation amount of the setting member 16. The controller 10 outputs a rotation command indicating, for example, a fuel injection amount, an injection timing, and a fuel injection rate to the injector to control the rotation speed of the engine 6 so that the determined target rotation speed of the engine 6 is achieved. Alternatively, the controller 10 outputs a rotation command indicating a fuel injection pressure or the like to the supply pump or the common rail to control the rotation speed of the engine 6 so that the determined target rotation speed of the engine 6 is achieved.

A rotation speed sensor 6a configured to detect an actual engine rotation speed (referred to as an actual rotation speed of the engine 6) is connected to the controller 10, and the actual rotation speed of the engine 6 is input to the controller 10. The rotation speed sensor 6a is, for example, a potentiometer configured to detect a rotation speed of a rotary member connected to a crankshaft of the engine 6. When a load is applied to the engine 6, the actual rotation speed of the engine 6 decreases from the target rotation speed of the engine 6. The amount of decrease in the actual rotation speed from the target rotation speed when a load is applied to the engine 29 (the difference between the target rotation speed of the engine and the actual rotation speed of the engine) is referred to as the drop amount of the engine.

Figure 4:
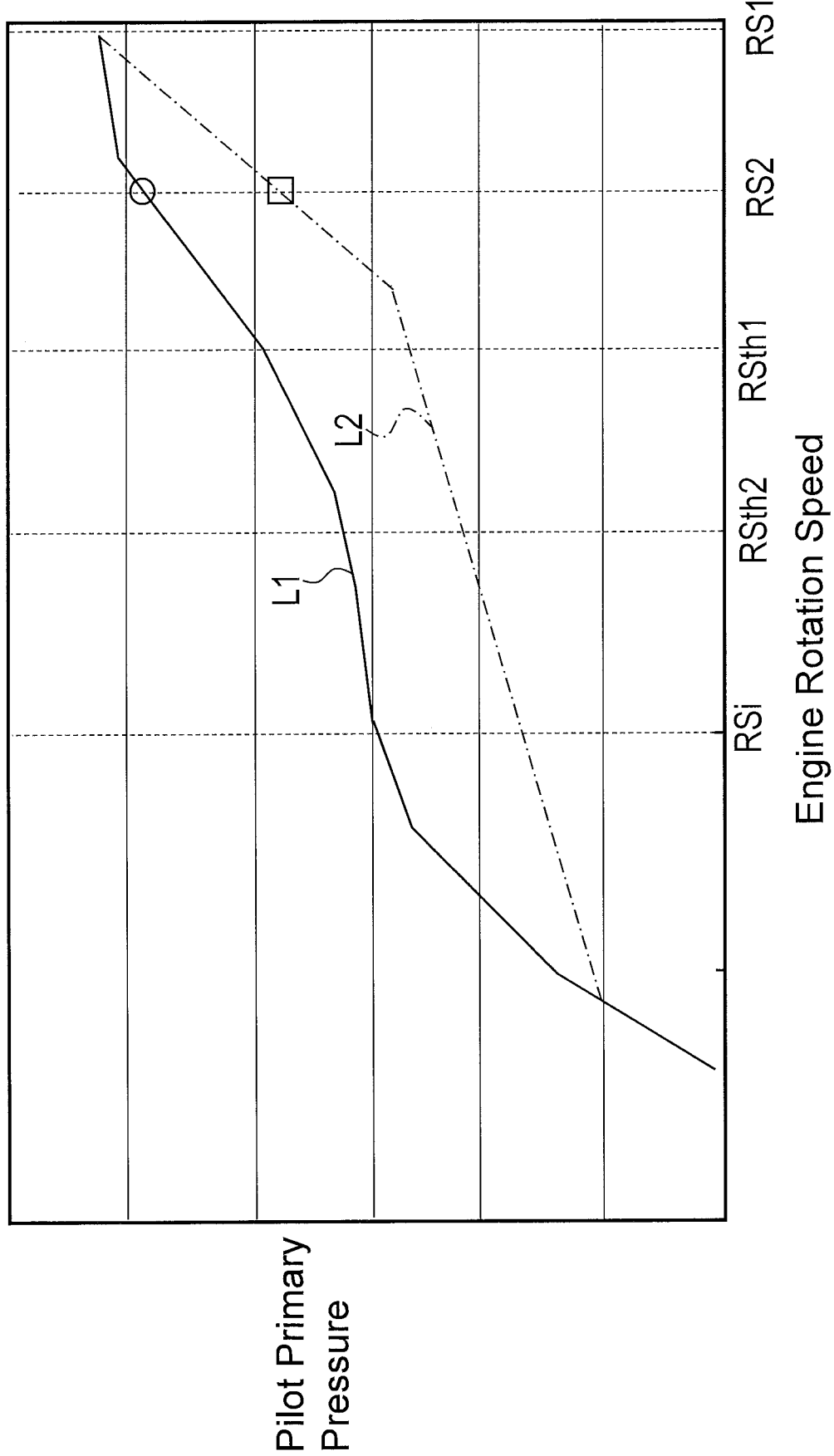
FIG. 4 is a diagram showing the relationship between the engine speed, the pilot primary pressure, and the set line.

The primary pressure control valve CV1 can set the pilot primary pressure acting on the input ports (primary side ports) of the plurality of operation valves OVA, OVB, OVC, and OVD based on the decrease amount (drop amount) ΔE1 of the rotation speed (engine rotation speed E1) of the engine 6. The rotation speed of the engine 6 can be detected by the rotation speed sensor 6a of the engine rotation speed E1. The engine rotation speed E1 detected by the rotation speed sensor 6a is input to the controller 10. FIG. 4 shows the relationship between the engine rotation speed, the pilot primary pressure, and the set lines L1 and L2. The set line L1 indicates the relationship between the engine rotation speed E1 and the pilot primary pressure when the decrease amount ΔE1 is less than the predetermined value (less than the anti-stall determination value). The set line L2 indicates the relationship between the engine rotation speed E1 and the pilot primary pressure when the decrease amount ΔE1 is equal to or larger than the anti-stall determination value. When the difference between the first rotation speed RS1 determined based on the operation amount of the setting member 16 and the actual rotation speed of the engine 6 is smaller than a predetermined stall determination speed difference (anti-stall determination value), the pilot primary pressure corresponding to the first rotation speed RS1 transitions in accordance with the first correspondence relationship indicated by the set line L1. When the difference between the first rotation speed RS1 and the actual rotation speed of the engine 6 is equal to or greater than a predetermined stall determination speed difference (anti-stall determination value), the pilot primary pressure corresponding to the first rotation speed RS1 transitions in accordance with the second correspondence relationship indicated by the set line L2.

When the decrease amount ΔE1 is less than the anti-stall determination value, the controller 10 adjusts the opening degree of the primary pressure control valve CV1 so that the relationship between the engine rotation speed E1 and the pilot primary pressure coincides with the reference pilot pressure indicated by the set line L1. When the decrease amount ΔE1 is equal to or larger than the anti-stall determination value, the controller 10 adjusts the opening degree of the primary pressure control valve CV1 so that the relationship between the engine rotation speed E1 and the pilot primary pressure coincides with the set line L1 that is lower than the reference pilot pressure. In the set line L2, the pilot primary pressure for a predetermined engine rotation speed E1 is lower than the pilot primary pressure of the set line L1. That is, when attention is paid to the same engine rotation speed E1, the traveling primary pressure of the set line L2 is set lower than the traveling primary pressure of the set line L1. Therefore, by the control based on the set line L2, the pressures (pilot pressures) of the hydraulic fluid entering the operation valves OVA, OVB, OVC, and OVD are suppressed to be low. As a result, the swash plate angles of the first and second hydraulic pumps 7L and 7R are adjusted, the load acting on the engine 6 is reduced, and the engine 6 can be prevented from stalling. Although one set line L2 is shown in FIG. 4, a plurality of set lines L2 may be provided. For example, the set line L2 may be set for each engine rotation speed E1. It is preferable that the controller 10 has the set line L1 and the set line L2, or control parameters such as functions.

Figure 5:
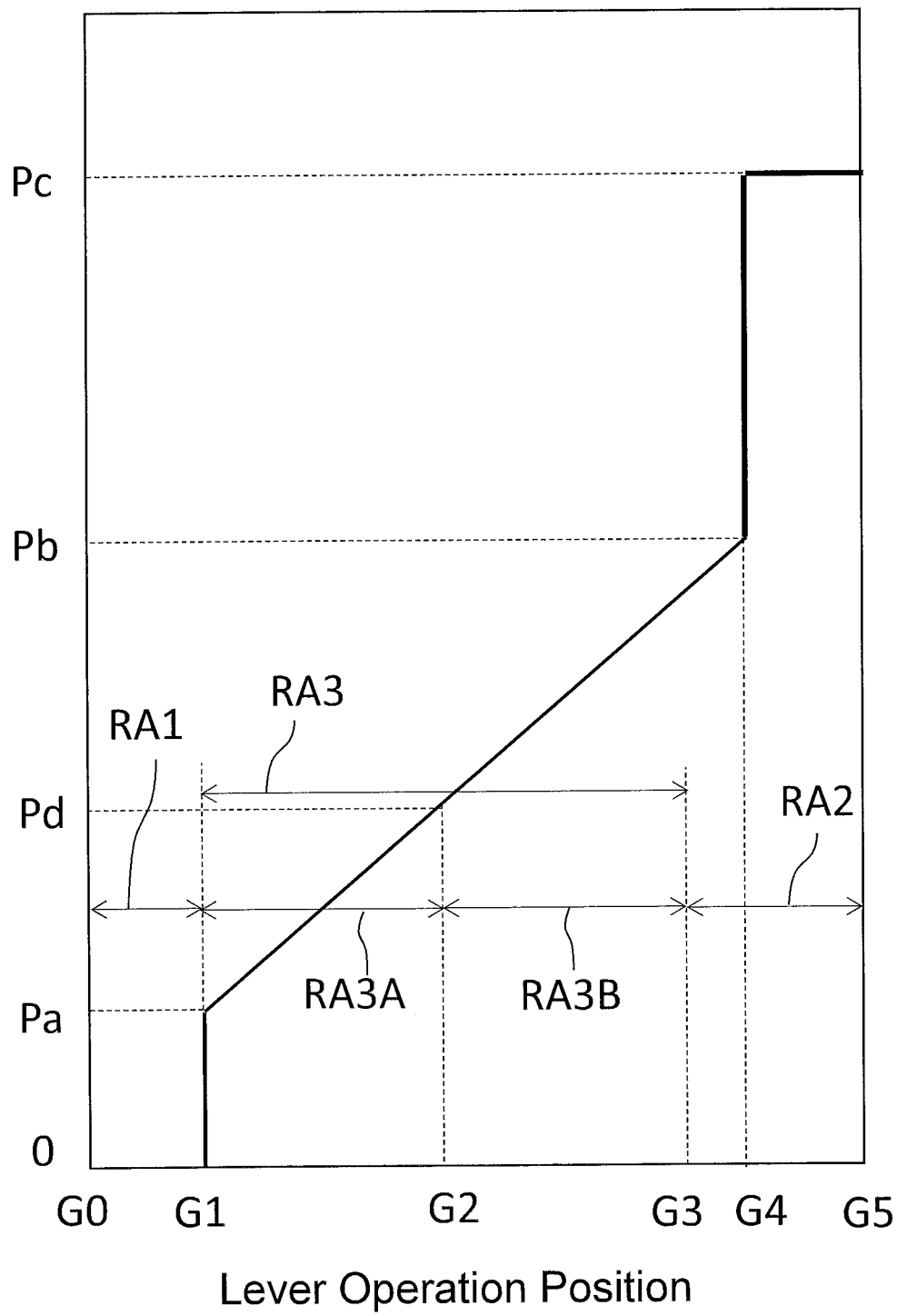
FIG. 5 is a view showing a relationship between an operation position of an operation lever and a traveling secondary source pressure.

Next, the pilot pressure outputted from the secondary side port of operation valves OVA, OVB, OVC, and OVDT will be described. This pilot pressure will hereinafter be referred to as the secondary pilot source pressure. FIG. 5 is a diagram showing the relationship between the operating position of the operating lever and the secondary pilot secondary source pressure. Referring to FIG. 4, the origin of the lever operation position is an operation start position (neutral position, G0 position) which is the start position of the lever stroke, and the lever operation position approaches an operation end position (G5 position) which is the end position of the lever stroke as the lever operation position moves away from the origin. The operation region of the travel instruction input device 55 is divided into a neutral region RA1 (from the G0 position to the G1 position in the illustrated example) in which the operation target does not operate, a full operation vicinity region RA2 (from the G3 position to the G5 position in the illustrated example) in the vicinity of the operation end, and an intermediate region RA3 (from the G1 position to the G3 position in the illustrated example) between the neutral region RA1 and full operation vicinity regions RA2. Further, the intermediate region RA3 is divided into a low speed region RA3A from the G1 position to the G2 position and an intermediate speed region RA3B from the G2 position to the G3 position.

In the neutral region RAI, the pilot secondary source pressure is not supplied even if the travel instruction input device 55 is operated. On the other hand, in the full operation vicinity region RA2, the speed adjustment of the operation target is not performed, and therefore, the travel instruction input device 55 is operated to the operation end position (G5 position) without stopping halfway. In the intermediate region RA3, the travel instruction input device 55 is stopped at an arbitrary position in the region or the position thereof is changed so that the speed of the operation target is adjusted to a speed desired by the operator. For example, the ratios of the operation regions RA1, RA3A, RA3B, and RA2 to the lever stroke are as follows.

Neutral region RA1: 0% or more and less than 15%
Slow speed region RA3A: 15% or more and less than 45%
Intermediate speed region RA3B: 45% or more and less than 75%
Full operation vicinity region RA2: 75% to 100%

In the characteristic diagram shown in FIG. 5, when the travel instruction input device 55 is operated from the G0 position to the G1 position, the pilot secondary source pressure (Pa) is generated, and when the travel instruction input device 55 is operated from the G1 position to the G4 position, the pilot secondary source pressure rises from Pa to Pb in proportion to the operation amount of the travel instruction input device 55. Further, at the G4 position, the pilot primary pressure is short-cut and flows to the secondary side, and the pilot secondary source pressure rises from Pb to the maximum output pressure Pc at once. While the travel instruction input device 55 is operated from the G4 position to the G5 position, the pilot secondary source pressure is constant at the maximum output pressure (Pc) and becomes equal to the pilot primary pressure. That is, the operation device 56 outputs the pilot primary pressure input to the operation device 56 to the first pilot port PLa and the fourth pilot port PRb when the displacement from the neutral position of the travel instruction input device 55 for instructing movement in the left direction is equal to or greater than the first displacement value (displacement from G0 to G4). The operation device 56 outputs the pilot primary pressure input to the operation device 56 to the second pilot port PLb and the third pilot port PRa when the displacement from the neutral position of the travel instruction input device 55 for instructing movement in the right direction is equal to or greater than the first displacement value (the displacement from G0 to G4). The operation device 56 outputs the pilot primary pressure input to the operation device 56 to the first pilot port PLa and the third pilot port PRa when the displacement from the neutral position of the travel instruction input device 55 for instructing movement in the forward direction is equal to or greater than the first displacement value (the displacement from G0 to G4). The operation device 56 outputs the pilot primary pressure input to the operation device 56 to the second pilot port PLb and the fourth pilot port PRb when the displacement from the neutral position of the travel instruction input device 55 for instructing movement in the rearward direction is equal to or greater than the first displacement value (the displacement from G0 to G4).

The characteristic value of the pilot secondary source pressure in the front-rear direction may be different from the characteristic value of the pilot secondary source pressure in the lateral direction. When the characteristic values of the pilot secondary source pressure in the front-rear direction corresponding to G0 to G5 and Pa to Pc are G0' to G5' and Pa' to Pc', the operation device 56 may output the pilot primary pressure input to the operation device 56 to the first pilot port PLa and the third pilot port PRa when the displacement of the travel instruction input device 55 for instructing forward movement from the neutral position is equal to or greater than the second displacement value (displacement from G0' to G4'). The operation device 56 may output the pilot primary pressure input to the operation device 56 to the second pilot port PLb and the fourth pilot port PRb when the displacement from the neutral position of the travel instruction input device 55 for instructing movement in the rearward direction is equal to or greater than the second displacement value (the displacement from G0' to G4'). Pa and Pb (Pa' and Pb') are values that do not depend on the magnitude of the pilot primary pressure. However, when the pilot primary pressure is lower than Pa or Pb (Pa' or Pb'), the pilot secondary source pressure reaches a plateau at the magnitude of the pilot primary pressure.

Figure 6:
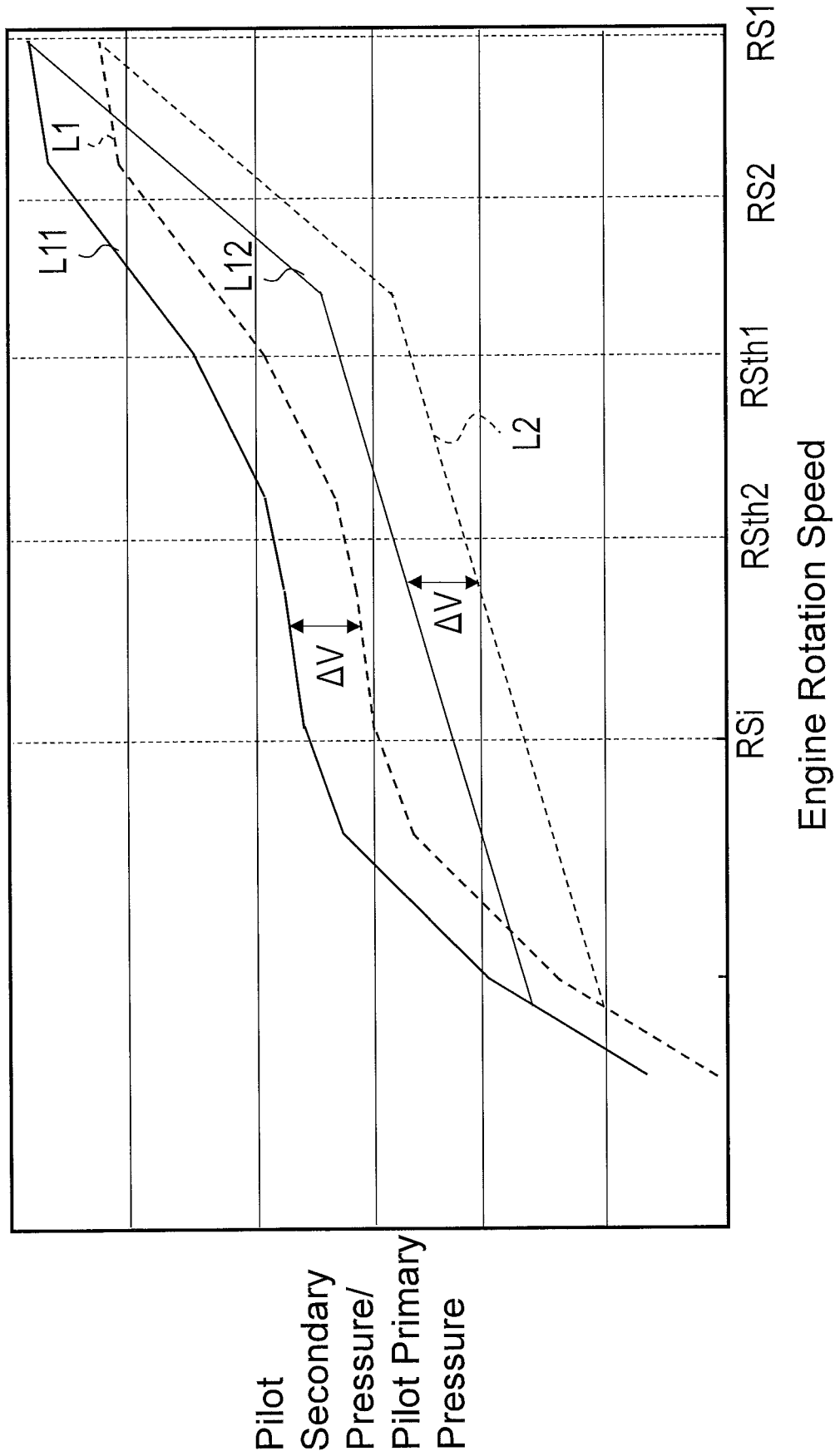
FIG. 6 is a diagram showing the relationship between the engine rotation speed, the pilot secondary pressure, and the set line.

Next, a detailed operation of the secondary pressure control valves CV2 will be described. FIG. 6 shows the relationship between the engine rotation speed, the pilot secondary pressure controlled by the secondary pressure control valves CV2, and the set lines L11 and L12 described later, similarly to FIG. 4. The controller 10 is configured to control the primary pressure control valve CV1 and the secondary pressure control valves CV2 based on a first target value of the primary pressure control valve CV1 and a second target value of the pilot secondary pressure. To be more specific, secondary pressure control valves CV2 is controlled by the controller 10 so that the second target value of the pilot secondary pressure becomes higher than the first target value of the pilot primary pressure controlled by the primary pressure control valve CV1 when the primary pressure control valve CV2 is controlled based on the set line CV1 in FIG. 4 and the operation valves OVA, OVB, OVC, OVD output the pilot secondary source pressure equal to the pilot primary pressure.

Immediately after the start of the anti-stall control (immediately after the reduction amount ΔE1 of the rotation speed of the engine 6 becomes equal to or larger than the anti-stall determination value), even if the pilot primary pressure is reduced by the primary pressure control valve CV1, the pilot pressure applied to the pilot ports PLa, PLb, PRa, PRb is not immediately reduced without the secondary pressure control valves CV2. On the other hand, if the secondary pressure control valves CV2 is operated in the same manner as the primary pressure control valve CV1, the pilot secondary pressure is controlled to be lower than the first target value based on the set line L2 in FIG. 4, which is the final pilot pressure, due to the hydraulic loss caused by the flow of the pilot oil from the secondary pressure control valves CV2 to the discharge oil passages DR3 and DR4. Therefore, as indicated by the set line L12 in FIG. 6, the second target value of the pilot secondary pressure is determined in accordance with the engine speed so as to be higher than the set line L2 by the offset ΔV in consideration of the pressure loss. With this control, the pilot secondary pressure can be smoothly reduced to the target pressure close to the value set by the primary pressure control valve CV1.

In the hydraulic circuit 1A shown in FIG. 3, since there is a similar pressure loss even in a state where the anti-stall control is not performed, when the pilot primary pressure is controlled based on the set line L1 in FIG. 4, the pilot secondary pressure is controlled in accordance with the engine rotation speed so as to be higher than the set line L11 by an offset ΔV in consideration of the pressure loss as shown by the set line L1 in FIG. 6. By performing control in this way, even in a state where anti-stall is not performed, when the viscosity of the pilot oil is high and the pilot secondary pressure becomes high, the secondary pressure control valves CV2 can be opened and the pilot oil can be forced to flow. Therefore, there is an advantage that warm-up can be smoothly performed.

Based on the characteristics of the operation valves OVA, OVB, OVC, and OVD described above, the movement of the work vehicle 1 corresponding to the operation of the travel instruction input device 55 will be described in more detail. When the operation amount of the travel instruction input device 55 in the front-rear direction is larger than the operation amount of the travel instruction input device 55 in the right direction and the operation position in the right direction is operated from the G1 position to the G3 position, the first hydraulic pump 7L rotate in the same direction in a state in which the magnitude of the rotational speed of the first hydraulic pump 7R is greater than the magnitude of the rotational speed of the second hydraulic pump SL, whereby the work vehicle 1 make a large turn to the right. When the operation position of the travel instruction input device 55 in the right direction becomes the same position as the operation position in the front-rear direction, the rotation speed of the second hydraulic pump 7R becomes 0, and only the first hydraulic pump 7L rotate, whereby the work vehicle 1 make a right pivot turn (right pivot turn). Further, when the travel instruction input device 55 is operated when the operation position in the right direction is between the G4 position and the G5 position, the operating position becomes larger than the operating position in the front-rear direction, the output shaft of the first hydraulic pump 7L rotates in the normal direction and the output shaft of the second hydraulic pump 7R rotates in the reverse direction, so that the work vehicle 1 turns to the right side.

Further, when the operation amount of the travel instruction input device 55 in the front-rear direction is larger than the operation amount in the left direction and the operation position of the travel instruction input device 55 in the left direction is operated from the G1 position to the G3 position, the magnitude of the rotation speed of the second hydraulic pump 7R is larger than the magnitude of the rotation speed of the first hydraulic pump 7L, whereby the work vehicle 1 turn left in a large turn. When the leftward operation position of the travel instruction input device 55 becomes the same position as the forward/backward operation position, the rotation speed of the first hydraulic pump 7L becomes 0, and only the second hydraulic pump 7R rotate, whereby the work vehicle 1 make a left pivot turn (left pivot turn). Further, when the travel instruction input device 55 is operated such that the leftward operation position is between the G4 position and the G5 position, the leftward operation position becomes larger than the forward/backward operation position, and the output shaft of the second hydraulic pump 7R rotates in the normal direction and the output shaft of the first hydraulic pump 7L rotates in the reverse direction, so that the work vehicle 1 turns to the left. In the embodiment according to the present application, turning refers to an operation of the work vehicle 1 when the operation position in the right direction is operated between the G4 position and the G5 position or when the operation position in the left direction is operated between the G4 position and the G5 position.

On the other hand, when the operation position of the travel instruction input device 55 in the forward direction is operated between the G4 position and the G5 position, the operation position becomes larger than the operation position in the left-right direction, and the output shafts of the first and second hydraulic pumps 7L and 7R rotate in the normal direction to move the work vehicle 1 forward at a high speed. When the operation position of the travel instruction input device 55 in the rearward direction is operated between the G4 position and the G5 position, the operation position becomes larger than the operation position in the left-right direction, and the output shafts of the first and second hydraulic pumps 7L and 7R are reversed to move the work vehicle 1 backward at a high speed. Other operations of the travel instruction input device 55 in the front-rear direction are the same as those in the left-right direction.

Figure 7:
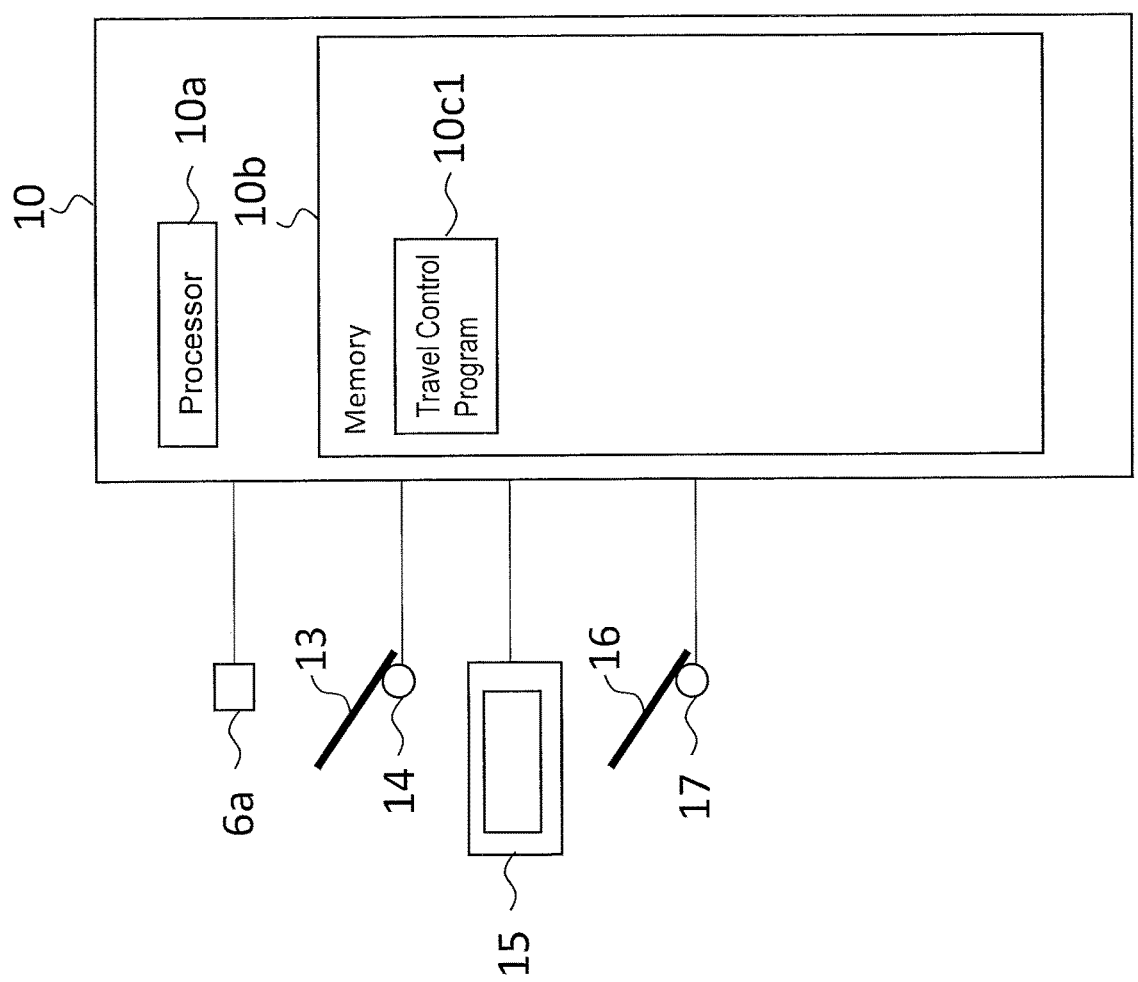
FIG. 7 is a block diagram of the work vehicle.

The work vehicle 1 is provided with various switches and sensors connected to the above-described controller 10. FIG. 7 is a block diagram of the work vehicle 1. Referring to FIG. 7, work vehicle 1 includes an operation panel 15. The operation panel 15 is, for example, a touch panel that displays various states of the work vehicle 1 and allows various settings according to the present embodiment to be performed. As described above, when the rotation speed of the engine 6 detected by the rotation speed sensor 6a is lower than the target rotation speed by a predetermined speed difference (anti-stall determination value) or more, the controller 10 controls both the primary pressure control valve CV1 and the secondary pressure control valves CV2 so that the second target value is higher than the first target value and the first target value and the second target value are decreased. To be specific, the controller 10 is configured to simultaneously control the primary pressure control valve CV1 and the secondary pressure control valves CV2 when the rotation speed of the engine 6 detected by the rotation speed sensor is lower than the target rotation speed by a predetermined speed difference (anti-stall determination value) or more.

The controller 10 has a processor 10a and a memory 10b as shown in FIG. 7 in order to realize the processing described above. The memory 10b includes a volatile memory and a nonvolatile memory. The memory 10b includes a travel control program 10c1 for realizing the above-described control. The processor 10a performs the above-described control while executing the travel control program 10c1. Hereinafter, a control method by the controller 10 and the operation device 56 will be described in detail.

Figure 8:
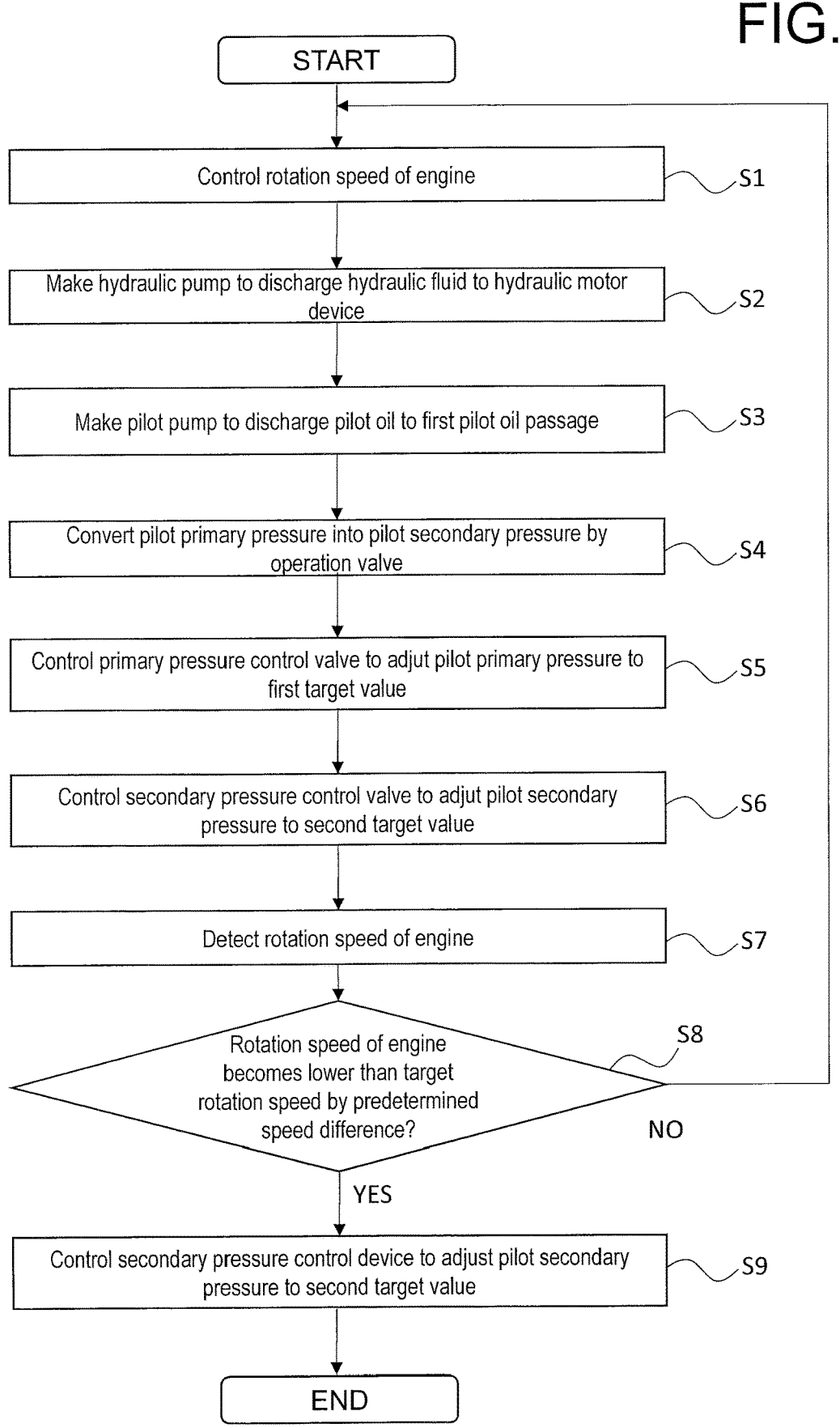
FIG. 8 is a flowchart illustrating an operation of the controller of the work vehicle according to the embodiment.

FIG. 8 is a flowchart showing the operation of the controller 10 of the work vehicle 1. In step S1, the controller 10 controls the engine 6 such that the rotation speed of the engine 6 becomes the target rotation speed. In step S2, the controller 10 drives the hydraulic pump 7 connected to the engine 6 to cause the hydraulic pump 7 to discharge the hydraulic fluid to the hydraulic motor device 30 connected to the traveling device 3. In step S3, the controller 10 drives the pilot pump 71 connected to the engine 6 to cause the pilot pump 71 to discharge the pilot oil to the first pilot oil passage 11. In step S4, the operation valves OVA, OVB, OVC, and OVD connected to the first pilot oil passage 11 convert the pilot primary pressure, which is the pressures of the pilot oil input to the operation valves OVA, OVB, OVC, and OVD, into the pilot secondary pressure and output the pilot secondary pressure to the second pilot oil passage 12 connected to the pilot port of the oil pump 7 in response to the instruction of the traveling direction by the user.

In Step S5, the controller 10 controls a primary pressure control valve CV1 provided in a first pilot oil passage 11 so that a pilot primary pressure becomes a first target value. In step S6, the controller 10 controls the secondary pressure control valves CV2 connected to the second pilot oil passage 12 so that the pilot secondary pressure becomes the second target value. In step S7, the rotation speed sensor 6a detects the rotation speed of the engine 6, and the controller 10 receives the detected rotation speed of the engine 6. In step S8, the controller 10 determines whether or not the rotation speed of the engine 6 detected by the rotation speed sensor 6a is lower than the target rotation speed by a predetermined speed difference (anti-stall determination value) or more.

When the speed difference falls below the predetermined speed difference (anti-stall determination value) or more (YES in step S8), the controller 10 controls both the primary pressure control valve CV1 and the secondary pressure control valves CV2 so that the second target value is higher than the first target value and the first target value and the second target value are decreased. To be more specific, when the rotation speed of the engine 6 detected by the rotation speed sensor 6a is lower than the target rotation speed by a predetermined speed difference (anti-stall determination value) or more (YES in step S8), the controller 10 simultaneously controls the primary pressure control valve CV1 and the secondary pressure control valves CV2.

<Operation and Effect of Embodiment>

When the rotation speed of the engine 6 detected by the rotation speed sensor 6a is lower than the target rotation speed by a predetermined speed difference (anti-stall determination value) or more, both the primary pressure control valve CV1 and the secondary pressure control valves CV2 are controlled so that the second target value is higher than the first target value and the first target value and the second target value are decreased. Therefore, by controlling the pilot pressure in accordance with the target pilot primary pressure in consideration of the pressure loss in the discharge oil passages DR3 and DR4, it is possible to provide the work vehicle 1 that performs anti-stall control with improved responsiveness while reducing the waste of the pilot oil.

<Modification>

Figure 9:
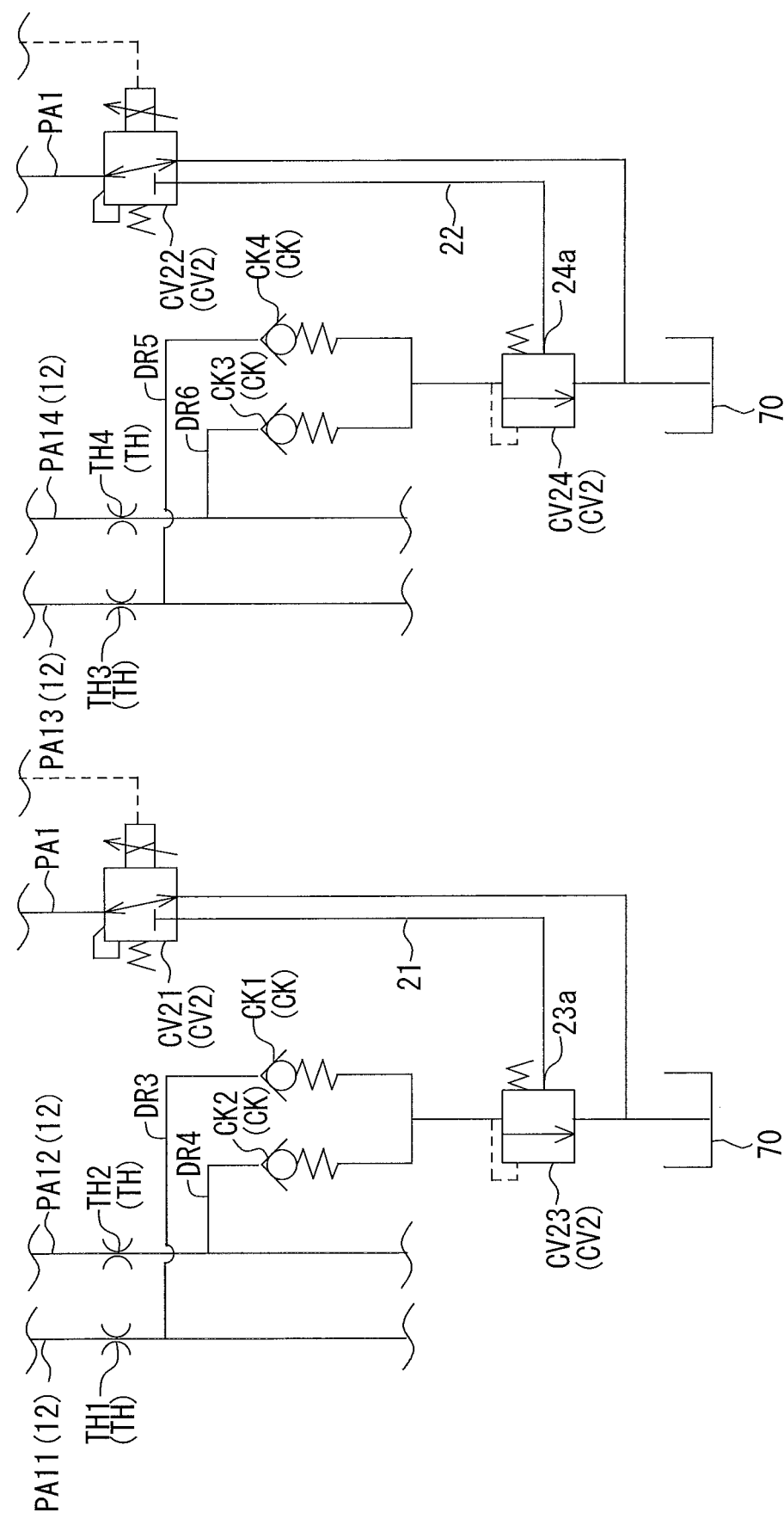
FIG. 9 is a hydraulic circuit diagram showing a secondary pressure control valve according to a modification.

The configuration of the secondary pressure control valves CV2 is not limited to the configuration shown in FIG. 3. FIG. 9 is a hydraulic circuit diagram showing a secondary pressure control valves CV2 according to a modified example. In the example of FIG. 9, check valves CK1 to CK4 are provided in the discharge oil passages DR3 to DR6. The check valves CK1 to CK4 are collectively referred to as check valves CK. The check valve CK block the discharge oil passages DR3 to DR6 unless the pressures on the sides of the throttles TH become higher than the pressures on the sides of the secondary pressure control valves CV2. In this modified example, the secondary pressure control valves CV2 is configured of proportional valves CV21, CV22 and relief valves CV23, CV24.

The relief valves CV23, CV24 are balance type relief valves whose set pressures for opening are variable based on the pressures of the pilot oil, and have control ports 23a, 24a that receive the pilot oil. The relief valves CV23, CV24 are configured to open when pressures at the input ports are greater than pressures at the control ports 23a, 24a. At this time, the pilot oil is discharged to the hydraulic fluid tank 70. The proportional valves CV21 and CV22 are connected to the hydraulic fluid passages 21 and 22 connected to the control ports 23a and 24a, and are supplied with the pilot oil from the pilot pump 71. The proportional valves CV21 and CV22 are solenoid proportional valves whose opening degrees can be changed by exciting solenoids, and are controlled by the controller 10.

Since the pilot pressure becomes high when the first hydraulic pump 7L rotates in the normal direction and the reverse direction, one of the discharge oil passages DR3 and DR4 becomes higher and the other becomes lower. Since the pilot pressure becomes high when the second hydraulic pump 7R rotates in the normal and reverse directions, the discharge oil passages DR5 and DR6 become higher on one side and lower on the other side. Therefore, only one of the check valves CK1 and CK2 is opened, and only one of the check valves CK3 and CK4 is opened. Therefore, the above-described control can be executed by controlling the proportional valves CV21 and CV22 in the same manner as the secondary pressure control valves CV11 and CV12.

The secondary pressure control valves CV11, CV12 in FIG. 3 may be replaced with the proportional valves CV21, CV22 and the relief valves CV23, CV24 shown in FIG. 9. The proportional valves CV21, CV22 and the relief valves CV23, CV24 in FIG. 9 may be replaced with the secondary pressure control valves CV11, CV12 in FIG. 3.

The term "comprising" and its derivatives are open-ended terms that specify the presence of elements but do not preclude the presence of other non-recited elements. This also applies to the terms "comprising", "including" and their derivatives.

The terms "member", "part", "element", "body", and "structure" may have multiple meanings, such as a single part or a plurality of parts.

Ordinal numbers such as "first" and "second" are merely terms used to identify the structure and have no other meaning (e.g., a particular order). For example, the existence of the "first element" does not imply the existence of the "second element", and the existence of the "second element" does not imply the existence of the "first element".

Terms such as "substantially", "about", and "approximately" to indicate the degree may mean a reasonable amount of deviation such that the final result does not change significantly, unless otherwise stated in the embodiments. All numerical values set forth herein may be construed to include words such as "substantially", "about", and "approximately".

In this application, the phrase "at least one of A and B" should be interpreted to include A alone, B alone, and both A and B.

Obviously, numerous modifications and variations of the present invention are possible in light of the above teachings. Accordingly, the present invention may be practiced otherwise than as specifically disclosed herein without departing from the scope of the present invention.

What is claimed is:

1. A work vehicle comprising:
   a hydraulic motor configured to drive a traveling device;
   a hydraulic pump having a pilot port to which pilot pressure of pilot oil is applied, the hydraulic pump being configured to supply hydraulic fluid to the hydraulic motor in accordance with the pilot pressure;
   an engine configured to drive the hydraulic pump;
   a rotation speed sensor configured to detect a rotation speed of the engine;
   a pilot pump configured to be driven by the engine to discharge the pilot oil;
   an operation lever configured to receive an instruction of a travel direction from a user;
   an operation valve configured to control the pilot pressure by operation of the operation lever;
   a first pilot oil passage connecting the pilot pump and the operation valve, the pilot oil being supplied through the first pilot oil passage;
   a primary pressure control valve provided in the first pilot oil passage and configured to control a pilot primary pressure which is a pressure of the pilot oil in the first pilot oil passage;
   a second pilot oil passage connecting the operation valve and the pilot port, the pilot oil being supplied through the second pilot oil passage;
   a secondary pressure control valve connected to the second pilot oil passage and configured to control a pilot secondary pressure which is a pressure of the pilot oil in the second pilot oil passage;
   control circuitry configured to control the rotation speed of the engine according to a target rotation speed of the engine, and control the primary pressure control valve and the secondary pressure control valve based on a first target value of the pilot primary pressure and a second target value of the pilot secondary pressure; and
   the control circuitry being configured to reduce the first target value and the second target value such that the second target value is higher than the first target value when the rotation speed of the engine detected by the rotation speed sensor becomes lower than the target rotation speed by a predetermined speed difference or more.

2. The work vehicle according to claim 1,
   wherein the control circuitry is configured to simultaneously control the primary pressure control valve and the secondary pressure control valve when the rotation speed of the engine detected by the rotation speed sensor becomes lower than the target rotation speed by the predetermined speed difference or more.

3. The work vehicle according to claim 2, further comprising:
   a discharge oil passage which is branched from the second pilot oil passage and via which the secondary pressure control valve is connected to the second pilot oil passage; and
   a throttle provided in the second pilot oil passage between the operation valve and the discharge oil passage.

4. The work vehicle according to claim 1, further comprising:
   a discharge oil passage which is branched from the second pilot oil passage and via which the secondary pressure control valve is connected to the second pilot oil passage; and a throttle provided in the second pilot oil passage between the operation valve and the discharge oil passage.

5. A control method for a work vehicle, comprising:

controlling an engine such that a rotation speed of the engine becomes a target rotation speed;

driving a hydraulic pump connected to the engine such that the hydraulic pump discharges hydraulic fluid to a hydraulic motor connected to a traveling device;

driving a pilot pump connected to the engine such that the pilot pump discharges pilot oil to a first pilot oil passage;

controlling an operation valve connected to the first pilot oil passage according to an instruction of a traveling direction by a user to convert a pilot primary pressure, which is a pressure of the pilot oil provided through the first pilot oil passage, into a pilot secondary pressure to be applied to the pilot oil in a second pilot oil passage connecting the operation valve and a pilot port of the hydraulic pump;

controlling a primary pressure control valve provided in the first pilot oil passage to adjust the pilot primary pressure to a first target value;

controlling a secondary pressure control valve connected to the second pilot oil passage to adjust the pilot secondary pressure to a second target value;

detecting the rotation speed of the engine; and controlling the primary pressure control valve and the secondary pressure control valve to reduce the first target value and the second target value such that the second target value is higher than the first target value when the rotation speed of the engine detected becomes lower than the target rotation speed by a predetermined speed difference or more.

6. The control method according to claim 5, wherein the controlling the primary pressure control valve and the secondary pressure control valve includes simultaneously controlling the primary pressure control valve and the secondary pressure control valve when the rotation speed of the engine detected by the rotation speed sensor becomes lower than the target rotation speed by the predetermined speed difference or more.

* * * * *